(12) United States Patent
Hopkins et al.

(10) Patent No.: US 9,014,723 B2
(45) Date of Patent: Apr. 21, 2015

(54) MANAGED ACCESS TO MULTIPLE WIRELESS CARRIERS

(75) Inventors: David Hopkins, Stewartstown, PA (US); Joseph Burdick, Pomona, NY (US)

(73) Assignee: United Parcel Service of America, Inc., Atlanta, GA (US)

(*) Notice: Subject to any disclaimer, the term of this patent is extended or adjusted under 35 U.S.C. 154(b) by 689 days.

(21) Appl. No.: 13/224,723

(22) Filed: Sep. 2, 2011

(65) Prior Publication Data

US 2013/0059626 A1    Mar. 7, 2013

(51) Int. Cl.
*H04W 24/00* (2009.01)
*H04W 48/18* (2009.01)
*H04W 88/06* (2009.01)

(52) U.S. Cl.
CPC .............. *H04W 48/18* (2013.01); *H04W 88/06* (2013.01)

(58) Field of Classification Search
CPC ........ H04W 72/02; H04W 4/02; H04W 36/00; H04W 48/18; H04W 60/00
USPC ...................... 455/456.1–456.6, 436; 370/338
See application file for complete search history.

(56) References Cited

U.S. PATENT DOCUMENTS

| 8,406,757 B1* | 3/2013 | Singh et al. ................. 455/432.1 |
| 2007/0060084 A1* | 3/2007 | Thompson et al. ......... 455/185.1 |
| 2010/0009712 A1* | 1/2010 | Kodama ...................... 455/550.1 |

* cited by examiner

*Primary Examiner* — Marcos Batista
(74) *Attorney, Agent, or Firm* — Alston & Bird LLP

(57) ABSTRACT

Systems, methods, apparatus, and computer program products are provided for managing access of mobile stations to a plurality of wireless carriers. For example, in one embodiment, a central system can provide configuration files to mobile stations. The mobile stations can use the configuration files to access a plurality of different wireless carriers, with the different wireless carriers potentially implementing distinct technologies and communication standards and protocols.

38 Claims, 5 Drawing Sheets

MANAGED ACCESS TO MULTIPLE WIRELESS CARRIERS

BACKGROUND

Wireless (e.g., cellular) communication infrastructures are typically made up of a variety of technologies, wireless carriers, and communication standards and protocols. Although some existing solutions allow for limited roaming, these solutions are constrained to common wireless technologies. Thus, a need exists for providing transitions of packet switched networks across multiple carriers and technologies based on various factors, such as network costs and availability.

BRIEF SUMMARY

In general, embodiments of the present invention provide systems, methods, apparatus, and computer program products for managing access of mobile stations to a plurality of wireless carriers.

In accordance with one aspect, a method for managing access of a mobile station to a plurality of wireless carriers is provided. In one embodiment, the method comprises (1) receiving a geographic configuration for a mobile station, wherein (a) the geographic configuration is for a geographic area and (b) identifies a plurality of wireless carriers providing wireless services within the geographic area; (2) identifying a primary wireless carrier associated with the geographic area from the plurality of wireless carriers; (3) initiating a session with the primary wireless carrier; (4) after initiating the session with the primary wireless carrier, terminating the session with the primary wireless carrier; (5) after terminating the session with the primary wireless carrier, identifying a secondary wireless carrier associated with the geographic area from the plurality of wireless carriers; and (6) initiating a session with the secondary wireless carrier.

In accordance with yet another aspect, a computer program product for managing access of a mobile station to a plurality of wireless carriers is provided. The computer program product may comprise at least one computer-readable storage medium having computer-readable program code portions stored therein, the computer-readable program code portions comprising executable portions configured to (1) receive a geographic configuration for a mobile station, wherein (a) the geographic configuration is for a geographic area and (b) identifies a plurality of wireless carriers providing wireless services within the geographic area; (2) identify a primary wireless carrier associated with the geographic area from the plurality of wireless carriers; (3) initiate a session with the primary wireless carrier; (4) after initiating the session with the primary wireless carrier, terminate the session with the primary wireless carrier; (5) after terminating the session with the primary wireless carrier, identify a secondary wireless carrier associated with the geographic area from the plurality of wireless carriers; and (6) initiate a session with the secondary wireless carrier.

In accordance with yet another aspect, an apparatus comprising at least one processor and at least one memory including computer program code is provided. In one embodiment, the at least one memory and the computer program code may be configured to, with the processor, cause the apparatus to at least (1) receive a geographic configuration for a mobile station, wherein (a) the geographic configuration is for a geographic area and (b) identifies a plurality of wireless carriers providing wireless services within the geographic area; (2) identify a primary wireless carrier associated with the geographic area from the plurality of wireless carriers; (3) initiate a session with the primary wireless carrier; (4) after initiating the session with the primary wireless carrier, terminate the session with the primary wireless carrier; (5) after terminating the session with the primary wireless carrier, identify a secondary wireless carrier associated with the geographic area from the plurality of wireless carriers; and (6) initiate a session with the secondary wireless carrier.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
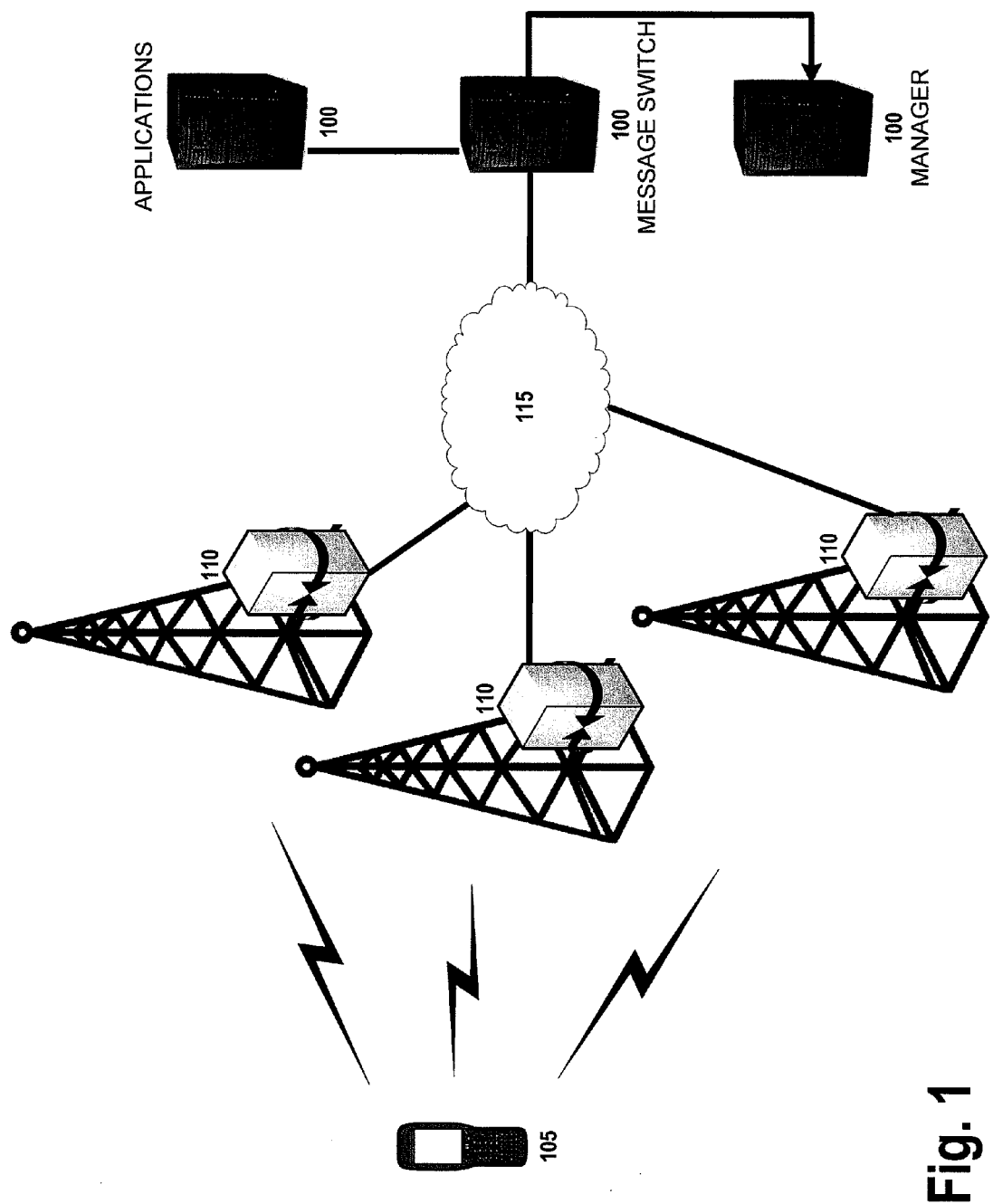
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a communication system that can be used in conjunction with various embodiments of the present invention. As shown in FIG. 1, the communication system may include one or more central systems 100, one or more mobile stations 105, one or more gateway nodes 110, and one or more networks 115. Each of the components of the communication system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Central System

Figure 2:
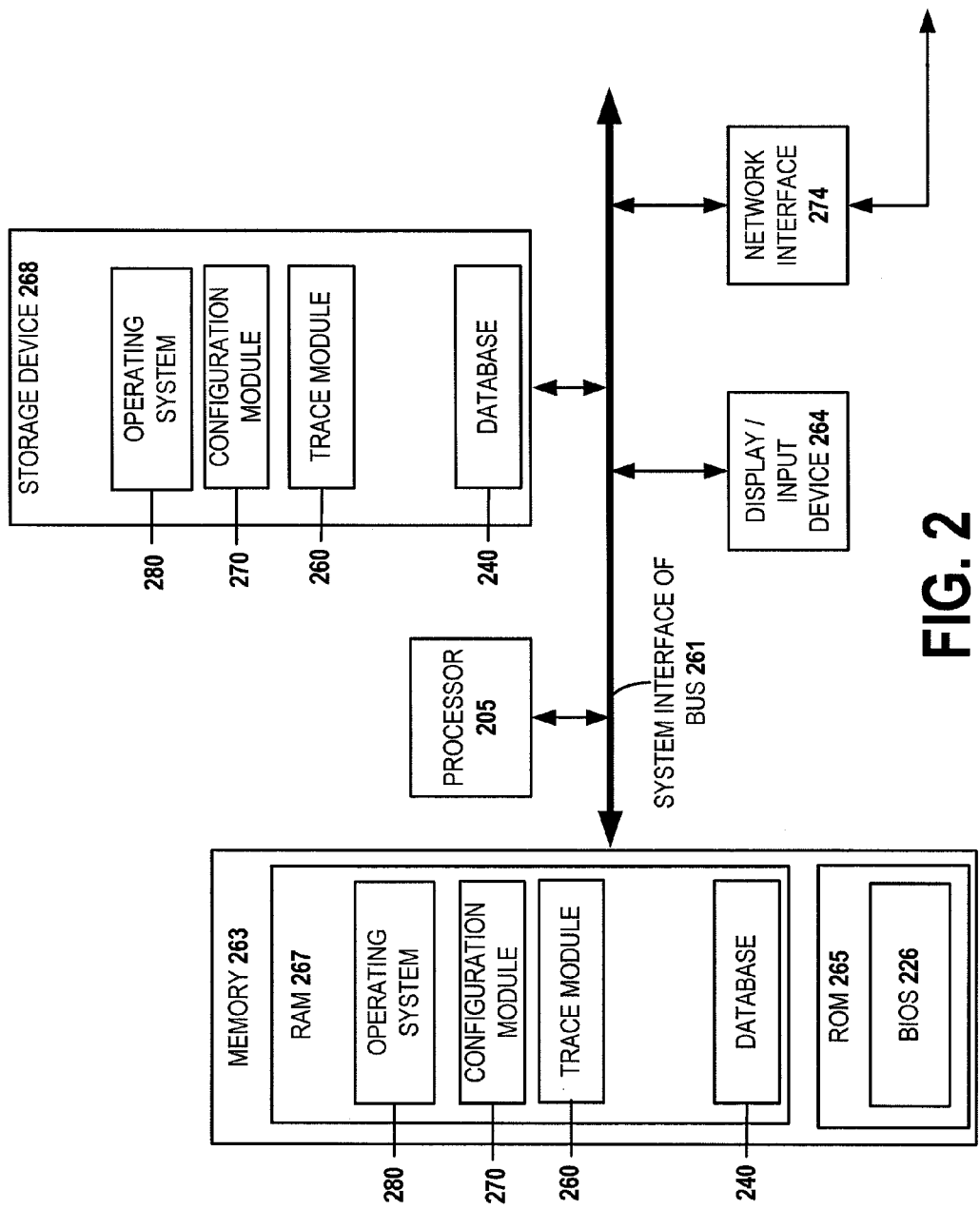
FIG. 2 is an exemplary schematic diagram of a central system according to one embodiment of the present invention.

FIG. 2 provides a schematic of a central system 100 according to one embodiment of the present invention. In general, the term "system" may refer to, for example, any computer, computing device, mobile phone, desktop, notebook or laptop, distributed system, server, blade, gateway, switch, processing device, or combination of processing devices adapted to perform the functions described herein. As shown in FIG. 1, the central system 100 may include one or more message switches, one or more application nodes, and one or more communication managers. As will be understood from FIG. 2, in one embodiment, the central system 100 includes a processor 205 that communicates with other elements within the central system 100 via a system interface or bus 261. The processor 205 may be embodied in a number of different ways. For example, the processor 205 may be embodied as a processing element, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the central system 100. This display device/input device 264 may be, for example, a keyboard or pointing device that is used in combination with a monitor. The central system 100 may further include transitory and non-transitory memory 263, which may include both random access memory (RAM) 267 and read only memory (ROM) 265. The central system's ROM 265 may be used to store a basic input/output system (BIOS) 226 containing the basic routines that help to transfer information to the different elements within the central system 100.

In addition, in one embodiment, the central system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, a configuration module 270, and a trace module 260. As discussed in more detail below, these modules may control certain aspects of the operation of the central system 100 with the assistance of the processor 205 and operating system 280—although their functionality need not be modularized. In addition to the program modules, the central system 100 may store or be in communication with one or more databases, such as database 240.

Also located within the central system 100, in one embodiment, is a network interface 274 for interfacing with various computing entities (e.g., with one or more mobile stations 105 and one or more gateway nodes 110). This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the central system's 100 components may be located remotely from other central system 100 components. Furthermore, one or more of the components may be combined and additional components performing functions described herein may be included in the central system 100.

2. Exemplary Mobile Station

Figure 3:
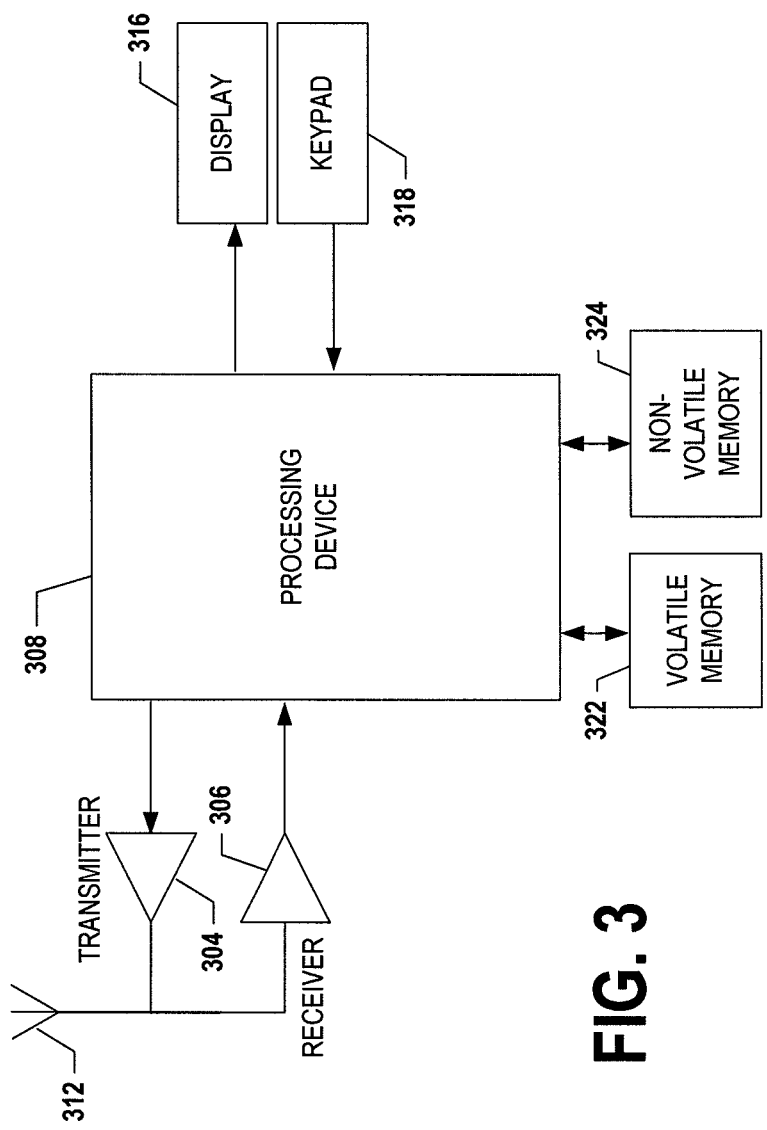
FIG. 3 is an exemplary schematic diagram of a mobile station according to one embodiment of the present invention.

FIG. 3 provides an illustrative schematic representative of a mobile station 105 that can be used in conjunction with the embodiments of the present invention. As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the central system 100. In a particular embodiment, the mobile station 105 may operate in accordance with multiple wireless communication standards and protocols (e.g., using a Gobi radio), such as GSM, UMTS, 1xRTT, and EVDO, and use multiple wireless carriers (e.g., China Mobile, Vodafone, Telefónica, T-Mobile, Verizon, AT&T, and Qtel). To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including modules), and operating system.

According to one embodiment, the mobile station 105 may include a location determining device and/or functionality. For example, the mobile station 105 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

3. Exemplary Gateway Node

As shown in FIG. 1, in one embodiment, gateway nodes 110 can be used in conjunction with embodiments of the present invention. In one embodiment, gateway nodes 110 may be operated by wireless carriers (e.g., China Mobile, Vodafone, Telefónica, T-Mobile, Verizon, AT&T, and Qtel) to provide wireless access for mobile stations 105 to wireless carriers' communication infrastructures. To do so, gateway nodes 110 may be connected to or comprise various entities. For example, a gateway node 110 may be connected to or comprise one or more radio access networks, one or more one or more base station controllers, one or more base transceiver stations, one or more mobile switching centers, one or more radio network controllers, one or more evolved nodes B, one or more mobile management entities, one or more subscriber databases, one or more packet gateways, one or more support nodes, and/or the like. As will be recognized, the gateway node 110 may support a variety of network types (e.g., wired, wireless, and/or the like) and various communications standards and protocols (e.g., FDDI, DSL, Ethernet, ATM, DOCSIS, 802.11, GPRS, UMTS, CDMA2000, 1xRTT, WCDMA, TD-SCDMA, LTE, E-UTRAN, EVDO, HSPA, HSDPA, Wi-Fi, WiMAX, UWB, IR, Bluetooth™, Customized Application of Mobile Enhanced Logic (CAMEL), Session Initiation Protocol (SIP), and/or the like).

4. Additional Exemplary Entities

Although not shown, embodiments of the present invention may function in coordination with a variety of other entities, such as origination switches, destination switches, network and switching subsystems, public switched telephone networks, and/or the like. Each of these entities may have one or more of the above-described components, such as (1) processing elements, (2) memory, (3) network interfaces, (4) transceivers, and/or (5) various other components. As will be recognized, each of these entities may support a variety of network types and various communications standards and protocols.

III. EXEMPLARY SYSTEM OPERATION

Figure 4:
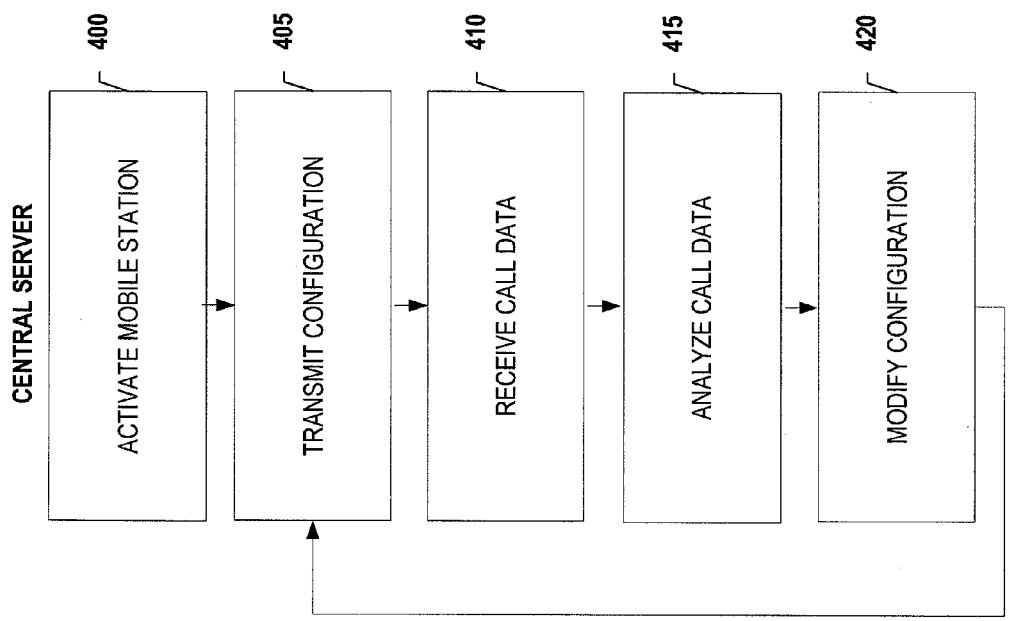
FIGS. 4-5 are flowcharts illustrating operations and processes that can be used in accordance with various embodiments of the present invention.
Figure 5:
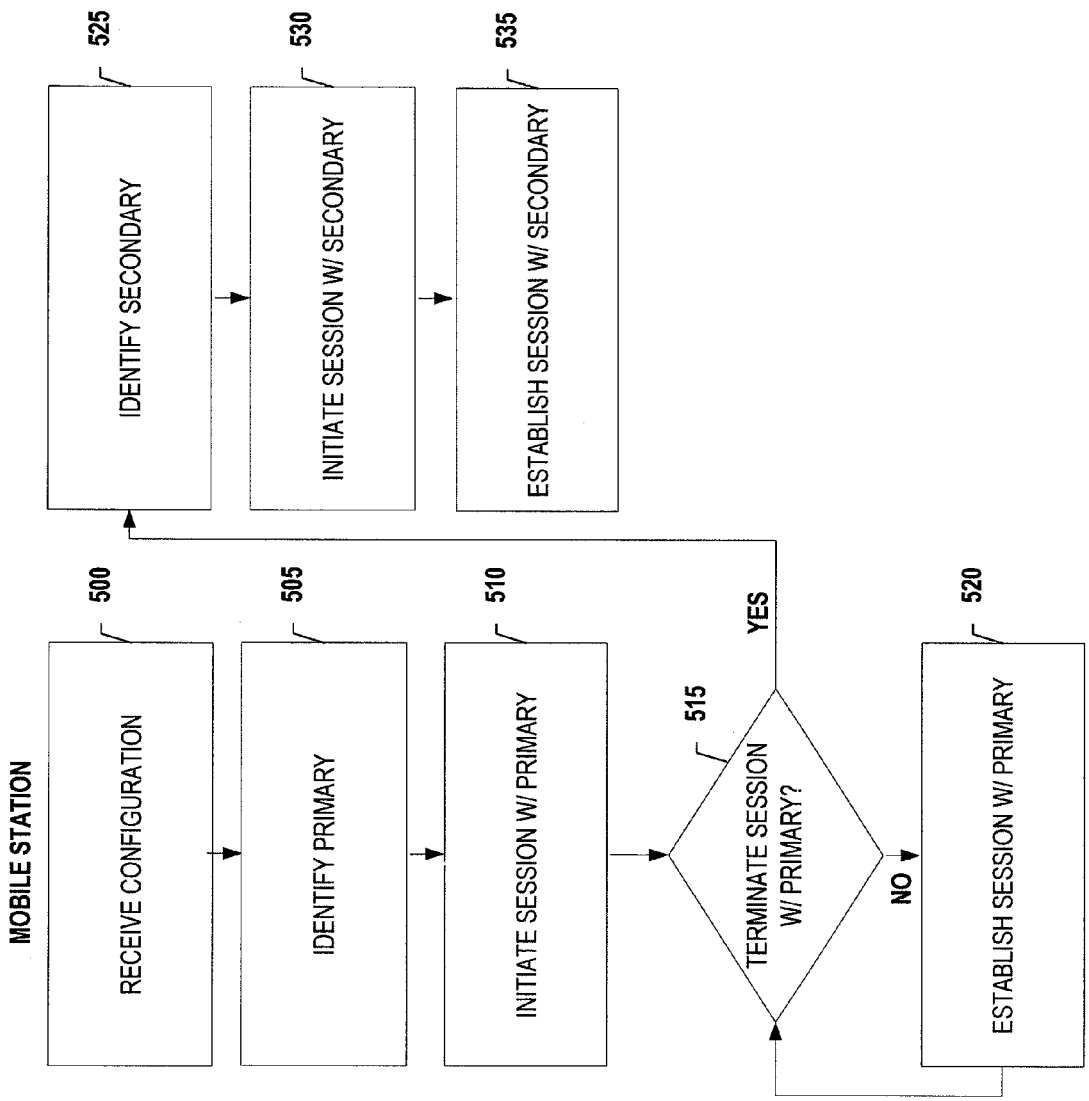

Reference will now be made to FIGS. 4-5. FIGS. 4-5 provide flowcharts illustrating operations that may be performed for managing access of mobile stations 105 to wireless carriers (e.g., cellular carriers).

1. Use of Multiple Carriers and Multiple Technologies, Standards, Protocols

As indicated, mobile stations 105 may operate in accordance with multiple wireless communication standards and protocols (e.g., GSM, WCDMA, UMTS, 1xRTT, and EVDO)

and use multiple wireless carriers (e.g., China Mobile, Vodafone, Telefónica, T-Mobile, Verizon, AT&T, and Qtel). High-level examples of some of the wireless communication standards and protocols are provided below.

In one embodiment, GPRS-related technologies may allow for connection to a home (or contract) wireless carrier. The home wireless carrier may allow mobile stations 105 to roam using visiting wireless carriers. Roaming enables mobile stations 105 to operate in wider geographic areas. In one embodiment, roaming functionality can be handled automatically by mobile stations 105 (e.g., automatically switching between networks). In other embodiments, manual wireless carrier selection may be possible for instances in which automatic wireless carrier selection may not provide the best service for a given mobile station 105.

Generally, mobile stations 105 using GPRS-related technologies use Subscriber Identity Modules (SIMs). SIMs may contain wireless carrier information that allows for connection to and use of GPRS-related networks. Most mobile stations 105 typically only house a single replaceable (e.g., field swappable) SIM. However, some mobile stations 105 can house multiple SIMs simultaneously; these SIMS can usually be switched under software control.

In one embodiment, CDMA-related technologies use tuning, connection, and maintenance information programmed into the mobile station 105 to connect to and use CDMA-related networks. For instance, each wireless carrier may have operational constraints and require separate programming and use. In one embodiment, this programming may be performed using general Over the Air (OTA) concepts. In another embodiment, where stability is important, the tuning, connection, and maintenance information may be programmed locally on the mobile stations 105. As will be recognized, a variety of technologies and communication standards and protocols can be used with embodiments of the present invention. Thus, the following examples are provided for illustrative purposes only.

In one embodiment, because mobile stations 105 may operate using a variety of different technologies and communication standards and protocols (e.g., GSM, WCDMA, UMTS, 1xRTT, and EVDO), the mobile stations 105 may use the wireless services of multiple wireless carriers (e.g., China Mobile, Vodafone, Telefónica, T-Mobile, Verizon, AT&T, and Qtel). For example, in a single geographic area (e.g., country, region, state, county, city, or town), there may be multiple wireless carriers providing wireless services. The wireless services coverage for one or more geographic areas can be evaluated. For each wireless carrier (and potentially each geographic area), the evaluation may contemplate the service costs, service reliability, session stability, wireless services footprint, longevity of a carrier's technology, carrier support, and compliance with network expectations on service attempts. After evaluating the wireless services for one or more geographic areas, agreements for wireless services in the geographic areas with the appropriate wireless carriers (e.g., a plurality of wireless carriers) can be established. For example, an enterprise can enter into agreements with various wireless carriers to provide wireless services to, for example, their employees operating mobile stations 105. Once agreements with wireless carriers have been established, mobile stations 105 associated with the geographic areas can be activated and configured to operate in accordance with the various carriers' technologies and communication standards and protocols.

2. Activation and Configuration of Mobile Stations

In one embodiment, a central system 100 can manage the access of mobile stations 105 to the plurality of wireless carriers in one or more geographic areas. For example, once agreements with wireless carriers have been established, mobile stations 105 associated with the various geographic areas can be activated with the various wireless carriers (Block 400 of FIG. 4). Activating mobile stations 105 with wireless carriers may include registering each mobile station 105 with the wireless carriers from which services are desired (e.g., based on the mobile station's 105 operating area). With numerous mobile stations 105 to manage, the central system 100 may provide for an automated activation process. For instance, when mobile stations 105 are shipped from manufacturers, the central system 100 (e.g., enterprise) can receive alerts with mobile-station specific information. Thus, based on where the mobile station will be used, the central system 100 can create database records using localized plans. The central system 100 may then request activation from the appropriate wireless carriers. The activation with a carrier may involve providing standardized request files to the wireless carrier, with the wireless carrier returning standardized response files acknowledging the activations.

In certain embodiments, it may not be practical for a mobile station 105 in a given geographic area to be configured to operate with more than a few wireless carriers. For instance, in one embodiment, it may be sufficient for the mobile station 105 to be activated on two wireless carriers: a primary wireless carrier and a secondary wireless carrier. In other embodiments, a third or fourth activation may be justified based on the available wireless services and actual coverage patterns in the geographic area in which a mobile station 105 will be used.

Additionally, the central system 100 can monitor requesting and tracking activations when the mobile stations 105 are deployed, relocated, and removed from service. For instance, when a mobile station 105 is relocated, the central system 100 can deactivate the mobile station 105 station from any wireless carriers from which wireless services will no longer be used by the mobile station 105. In this example, the central system 100 may also activate the mobile station 105 with any other appropriate wireless carriers in the new operating area. Moreover, as another example, the central system 100 can decommission mobile stations 105 (e.g., for lack of actual use or by explicit request).

In addition to activating mobile stations 105, the central system 100 may be used to configure the mobile stations 105 to use the wireless services of wireless carriers. To do so, the central system 100 may create and provide a geographic configuration (e.g., a geographic configuration file) for all mobile stations 105 operating within a specific geographic area, such as a country, region, state, county, city, town, or other area. For example, the central system 100 may provide a geographic configuration to all mobile stations 105 operating in the greater Atlanta, Ga. area to use the wireless services of AT&T, T-Mobile, and Verizon. The geographic configuration may also provide an order in which the wireless carriers should be accessed. For example, AT&T may be designated as a primary carrier for mobile stations 105 operating in the greater Atlanta, Ga. area. Similarly, T-Mobile and Verizon may be designated as secondary carriers for mobile stations 105 operating in the greater Atlanta, Ga. area. In another embodiment, the geographic configuration may define one or more geofences, for example, that are associated with particular primary and secondary wireless carriers.

In another embodiment, the geographic configuration may indicate that all mobile stations 105 operating in the United States are to use the wireless services of Verizon, AT&T, and Sprint. The geographic configuration may also designate (a) Verizon as a primary carrier for mobile stations 105 operating in the United States and (b) AT&T and T-Mobile as secondary carriers for mobile stations 105 operating in the United States. As will be recognized, there may be various geographic configurations, such as a geographic configuration for each country, region, state, county, city, or town. Additionally, the geographic configuration may include additional information and parameters, such as designated Access Point Names (APNs), usernames and passwords, and carrier supplied Preferred Roaming Lists (PRLs).

In one embodiment, the central system 100 may create and provide a station-type configuration for each type of mobile station 105 used by an enterprise. For example, an enterprise have different types of mobile stations 105, each using different hardware, firmware, and software. Thus, the different configurations may be rather extensive and be customized down to, for example, the individual mobile station 105. In one embodiment, station-type configurations may be used to provide mobile stations 105 with, for instance, tuning parameters with build-time embedded default values, such as the number of occurrences of a failed carrier dial-up would be permitted before changing the current wireless carrier (e.g., changing from a primary wireless carrier to a secondary wireless carrier). The station-type configuration may include a variety of other information and parameters, such as device specific 'AT' commands. In various embodiments, for practical maintenance reasons, it may be more efficient to keep the station-type configurations (and the geographic configurations) as universal possible.

In one embodiment, the central system 100 can provide the station-type configurations and geographic configurations to the corresponding mobile stations 105 as, for example, XML files (Block 405 of FIG. 4). For instance, in one embodiment, the central system 100 may transmit geographic configurations and/or station-type configurations to the appropriate mobile stations 105 periodically (e.g., daily, weekly, monthly, or as a result of modifications to the configurations). In various embodiments, this approach may allow for the configurations to be managed centrally for the enterprise and updated regularly. This approach may also provide for easy setup for a large number of mobile stations 105. In one embodiment, after the mobile stations 105 receive the necessary configurations (e.g., XML files), the mobile stations 105 can configure themselves accordingly, such as the next time the mobile station 105 is used (Block 500 of FIG. 5).

3. Control of Mobile Stations

As indicated, the configurations may identify a primary wireless carrier and one or more secondary wireless carriers (e.g., a plurality of wireless carriers) to use for wireless services. In one embodiment, the primary wireless carrier may be the wireless carrier the mobile station 105 should use under normal conditions. The one or more secondary wireless carriers may be the wireless carriers the mobile station 105 can use in the event of communication issues, for example, with the primary wireless carrier. For instance, the mobile station 105 may switch from the primary wireless carrier to a secondary wireless when, for instance, something fails and is not recoverable by establishing a new session with the primary wireless carrier. Identifying the appropriate secondary wireless carrier to be used may be based on a variety of factors, including location, coverage availability, signal strength, and/or the like.

In one embodiment, by using multiple technologies and a common control mechanism (e.g., software), the mobile station 105 can manage communications with multiple wireless carriers and drive the network connections. This may include path switching (e.g., software path switching) accomplished at build-time where different hardware is to be used and/or at run-time where it makes sense to act in different ways over time based on the actual conditions identified. Generally, path switching may refer to branching of software, for example, to address the needs of a specific mobile station 105. Moreover, to adapt to different mobile stations 105, conditional compile-time switches can be used to enable blocks of code suitable for a specific mobile station 105.

In one embodiment, before transmitting and/or receiving data, mobile stations 105 may go through several are several discrete phases: (1) powering on; (2) initializing and preparing the radio (e.g., low level dialog); (3) associating the radio with a wireless carrier (e.g., registration, attach); (4) preparing to dial; (5) performing dial and establishing a network session; and (6) transacting data packets. As will be recognized, the ways for accomplishing these phases may vary from one mobile station 105 to another. Thus, the preceding and following examples are not intended to limit embodiments of the present invention to any particular technology or communication standard or protocol.

In one embodiment, as indicated in Blocks 505 and 510 of FIG. 5, the mobile station 105 may begin by identifying a primary wireless carrier and initiating a session with the primary wireless carrier. The primary wireless carrier may be identified via information in the geographic configuration. For example, the geographic configuration may list AT&T, T-Mobile, and Verizon as the potential wireless carriers for the mobile station 105, and further list AT&T as the primary wireless carrier and Verizon and T-Mobile as secondary wireless carriers. As indicated, initiating a session may include various steps such as (1) powering on; (2) initializing and preparing the radio (e.g., low level dialog); (3) associating the radio with a wireless carrier (e.g., registration, attach); and (4) preparing to dial. As will be recognized, though, initiating a session may include a variety of other steps as well and is not limited to those described above. Under ideal operating conditions, the mobile station 105 may be able to complete these steps and ultimately establish the session with the primary wireless carrier (Block 520 of FIG. 5). For instance, establishing the session may include (5) performing dial and establishing a network session and (6) transacting data packets. As indicated, establishing a session may include a variety of other steps as well and is not limited to those described above.

In one embodiment, after initiating the session with the primary wireless carrier or establishing a session with the primary wireless carrier, the mobile station 105 can terminate initiation of the session or terminate the established session (both of which are referred to as terminating the session)—(Block 515 of FIG. 5). In one embodiment, the mobile station 105 can terminate sessions for a variety of reasons. For example, the mobile station 105 may terminate a session (e.g., terminate initiation of a session or terminate an established session) because of, for example, a network drop, failure to find service, failure to attach, a communicated error code, low signal strength, a radio hardware failure, a failed dial, and/or failure to transact messages. In one example, the mobile station 105 may attempt to repeatedly register with a gateway node 110, but not receive any corresponding responses. In this case, the mobile station 105 may terminate the session (e.g., terminate initiation of the session) with the wireless carrier. In another example, after establishing a session, a mobile station 105 may transmit messages a number of times and fail to receive back acknowledgements from the appropriate gateway node 110 indicating that the messages have been received. As will be recognized, a session can be terminated for a variety of other reasons as well.

In one embodiment, if a mobile station 105 determines a wireless services issue to be something other than a temporary loss of coverage, the mobile station 105 may use one of the secondary wireless carriers. For example, after terminating a session with a primary wireless carrier, the mobile station 105 can identify a secondary wireless carrier (e.g., Verizon) associated with the geographic area from the plurality of wireless carriers (Block 525 of FIG. 5). As indicated, the secondary wireless carriers (and any protocols for changing wireless carriers) may be included in the geographic and/or station-type configurations. Continuing with the above example, the geographic configuration may list Verizon and T-Mobile as secondary wireless carriers. In such a case, identifying the appropriate secondary wireless carrier to be used may be based on a variety of factors, including location, coverage availability, signal strength, and/or the like. In another embodiment, there may be only a single secondary wireless carrier that the mobile station 105 can use.

Depending on the secondary wireless carrier's technology and communications standards and protocols, the mobile station 105 may execute various steps to communicate with the secondary wireless carrier. For example, the mobile station 105 may modify internal records within the radio and/or reload the radio's firmware. This may particularly be the case when the primary and secondary wireless carriers are based on distinct technologies, such as the primary wireless carrier using UMTS-related technologies, and the secondary carrier using CDMA-related technologies.

Additionally, in one embodiment, the mobile station 105 may "back off" the primary or secondary wireless carrier from a predetermined period of time (e.g., 5, 15, 30, 45, or 50 minutes). Backing off the wireless carrier may include indicating the wireless carrier as unavailable for the predetermined period of time. Thus, for example, when the mobile station 105 sequences through the various states, it can identify which wireless carriers are available and when the primary (or last-used) wireless carrier (now marked as unavailable) will be available again. In various embodiments, this may prevent the mobile station 105 from repeatedly attempting to initiate sessions with the same wireless carrier when communication issues with the carrier are present.

It should also be noted that the mobile station 105 may queue any pending messages at least until the session with the secondary wireless carrier is established. In various embodiments, this allows for such messages to be communicated via the secondary wireless carrier's network once a session is established.

In one embodiment, once the mobile station 105 performs any necessary setup, the mobile station 105 can initiate a session with the appropriate secondary wireless carrier (Block 530 of FIG. 5). As indicated, initiating a session may include various steps such as (1) powering on; (2) initializing and preparing the radio (e.g., low level dialog); (3) associating the radio with a wireless carrier (e.g., registration, attach); and (4) preparing to dial. Initiating a session, though, may include a variety of other steps as well. After initiating the session with the appropriate secondary wireless carrier, the mobile station 105 may ultimately establish the session with the secondary wireless carrier (Block 535 of FIG. 5). Establishing the session may include (5) performing dial and establishing a network session and (6) transacting data packets.

As will be recognized, in the event of further wireless services issues, the mobile station 105 may perform similar steps to communicate with another secondary wireless carrier (e.g., T-Mobile). In various embodiments, this may depend on the number of wireless carriers the mobile station 105 can use and the geographic and station-type configurations identifying how the mobile station 105 is to react to wireless services issues. Similarly, if the predetermined back off time has elapsed, the mobile station 105 may perform similar steps to again communicate (or attempt to communicate) with the primary wireless carrier (e.g., AT&T).

4. Management and Maintenance

In one embodiment, the central system 100 may receive call data (e.g., call trace data and/or call tracking data) from the various mobile stations 105 (Block 410 of FIG. 4). For example, mobile stations 105 may routinely, periodically, and/or continuously transmit call data to the central system 100. The call data may include information about radio control states, error codes, environmental factors (e.g., location), operator identification information, signal strength, size and identifiers of messages sent and received, and/or the like. The central system 100 can then may routinely, periodically, and/or continuously process the call data into database records, for example, that reflect the profile of behavior throughout a day, week, month, and/or other time period.

In one embodiment, the central system 100 may analyze the call data for patterns (Block 415 of FIG. 4). For instance, the central system 100 may analyze the call data for one or more mobile stations 105 to identify and/or monitor various fault patterns, such as inadequate coverage patterns, signal strength patterns, failure to register patterns, failure to attach patterns, failure to obtain network patterns, failure to deliver packets patterns, and/or the like. In one embodiment, by identifying fault patterns, the central system 100 can identify issues that my need to be addressed with the wireless carriers. Further, by performing the analysis globally, fault patterns can be detected that may identify problems spanning a small geographic area, a whole country, or a wireless carrier's entire network.

Additionally, in one embodiment, the central system 100 can identify problematic mobile stations 105 or types of mobile stations 105. For example, the central several 100 can provide reports on the analysis, such as regional summaries at multiple levels ranging from the entire enterprise down to a single device. The central system 100 can also provide alerts on problem conditions that may need support intervention and provide detailed information and analysis for individual mobile stations 105 under investigation. In many instances, such problems can often be addressed by modifications to the geographic and/or station-type configurations. Thus, the central system 100 may update configurations (e.g., geographic and/or station-type) based on the analysis (Block 420 of FIG. 4). For example, the central system 100 may be configured to modify the geographic configuration based at least in part on the fault patterns identified in the call data. This may include removing a particular wireless carrier with certain fault patterns from the configuration or changing primary carriers for certain geographic areas. When such modifications are made, the central system 100 can push out the new configurations, for example, to the appropriate mobile stations 105.

In various embodiments, this centralized approach may allow for standardized reporting to provide support personnel with details of network activity. For instance, reporting summaries can provide network and fault pattern views at various levels, such as the operational center level, region level, and/or the like. The reports and other data can be exported to various management systems for further analysis and reconciliation with traffic coming from back-end systems. The various systems can use the feedback from the mobile stations 105 to handle unexpected deployments or moves and ensure that the planned configurations and planned use are properly reported back as the actual use. This approach may enable both server-side tracking for outbound messages and station-side tracking for inbound messages. In various embodiments, this may also allow the central system 100 to proactively identify anomalies (e.g., increases in packet failures). As will be recognized, this approach can be used to provide for closed loop management of an enterprise's mobile stations 105. A variety of other approaches and techniques may also be used within the scope and spirit of embodiments of the present invention.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for managing access of a mobile station to a plurality of wireless carriers, the method comprising:
    receiving, from a network device, a geographic configuration for the mobile station, wherein the geographic configuration (a) is for a geographic area and (b) identifies a plurality of wireless carriers providing wireless services within the geographic area;
    receiving, from the network device, a station-type configuration (a) specifying criteria in which the mobile station is to switch from using at least one primary wireless carrier identified in the geographic configuration to at least one secondary wireless carrier identified in the geographic configuration, and (b) specifying information identifying the manner in which the mobile station is designated to react to one or more wireless service issues;
    identifying a primary wireless carrier, indicated in the received geographic configuration, associated with the geographic area from the plurality of wireless carriers;
    initiating a session with the primary wireless carrier;
    after initiating the session with the primary wireless carrier, terminating the session with the primary wireless carrier based in part on the specified information of the station-type configuration;
    after terminating the session with the primary wireless carrier, identifying a secondary wireless carrier, indicated in the received geographic configuration, associated with the geographic area from the plurality of wireless carriers; and
    initiating a session with the secondary wireless carrier.

2. The method of claim 1, wherein the session with the primary wireless carrier is abandoned for failure to establish the session.

3. The method of claim 2 further comprising indicating the primary wireless carrier as unavailable for a predetermined period of time.

4. The method of claim 1, wherein the session with the primary wireless carrier is established and abandoned as a result of a network dropping the session.

5. The method of claim 4 further comprising establishing the session with the secondary wireless carrier.

6. The method of claim 5 further comprising queuing a pending message at least until the session with the secondary wireless carrier is established.

7. The method of claim 1, wherein terminating the session with the primary wireless carrier is based at least in part one selected from the group consisting of (a) a network drop, (b) a communicated error code, and (c) a failure to transact messages.

8. The method of claim 1, wherein the received station-type configuration is specific for the type of mobile station.

9. The method of claim 8, wherein initiating the session with the primary wireless carrier is based at least in part on the geographic configuration and the station-type configuration.

10. An apparatus comprising at least one processor and at least one memory including computer program code, the at least one memory and the computer program code configured to, with the processor, cause the apparatus to at least:
    receive, from a network device, a geographic configuration for a mobile station, wherein the geographic configuration (a) is for a geographic area and (b) identifies a plurality of wireless carriers providing wireless services within the geographic area;
    receive, from the network device, a station-type configuration (a) specifying criteria in which the mobile station is to switch from using at least one primary wireless carrier identified in the geographic configuration to at least one secondary wireless carrier identified in the geographic configuration, and (b) specifying information identifying the manner in which the mobile station is designated to react to one or more wireless service issues;
    identify a primary wireless carrier, indicated in the received geographic configuration, associated with the geographic area from the plurality of wireless carriers;
    initiate a session with the primary wireless carrier;
    after initiating the session with the primary wireless carrier, terminate the session with the primary wireless carrier based in part on the specified information of the station-type configuration;
    after terminating the session with the primary wireless carrier, identify a secondary wireless carrier, indicated in the received geographic configuration, associated with the geographic area from the plurality of wireless carriers; and
    initiate a session with the secondary wireless carrier.

11. The apparatus of claim 10, wherein the session with the primary wireless carrier is abandoned for failure to establish the session.

12. The apparatus of claim 11, wherein the memory and computer program code are further configured to, with the processor, cause the apparatus to indicate the primary wireless carrier as unavailable for a predetermined period of time.

13. The apparatus of claim 10, wherein the session with the primary wireless carrier is established and abandoned as a result of a network dropping the session.

14. The apparatus of claim 13, wherein the memory and computer program code are further configured to, with the processor, cause the apparatus to establish the session with the secondary wireless carrier.

15. The apparatus of claim 14, wherein the memory and computer program code are further configured to, with the processor, cause the apparatus to queue a pending message at least until the session with the secondary wireless carrier is established.

16. The apparatus of claim 10, wherein terminating the session with the primary wireless carrier is based at least in part one selected from the group consisting of (a) a network drop, (b) a communicated error code, and (c) a failure to transact messages.

17. The apparatus of claim 10, wherein the received station-type configuration is specific for the type of mobile station.

18. The apparatus of claim 17, wherein initiating the session with the primary wireless carrier is based at least in part on the geographic configuration and the station-type configuration.

19. A computer program product for managing access of a mobile station to a plurality of wireless carriers, the computer program product comprising at least one non-transitory computer-readable storage medium having computer-readable program code portions stored therein, the computer-readable program code portions comprising:
   an executable portion configured to receive, from a network device, a geographic configuration for the mobile station, wherein the geographic configuration (a) is for a geographic area and (b) identifies a plurality of wireless carriers providing wireless services within the geographic area;
   an executable portion configured to receive, from the network device, a station-type configuration (a) specifying criteria in which the mobile station is to switch from using at least one primary wireless carrier identified in the geographic configuration to at least one secondary wireless carrier identified in the geographic configuration, and (b) specifying information identifying the manner in which the mobile station is designated to react to one or more wireless service issues;
   an executable portion configured to identify a primary wireless carrier, indicated in the received geographic configuration, associated with the geographic area from the plurality of wireless carriers;
   an executable portion configured to initiate a session with the primary wireless carrier;
   an executable portion configured to, after initiating the session with the primary wireless carrier, terminate the session with the primary wireless carrier based in part on the specified information of the station-type configuration;
   an executable portion configured to, after terminating the session with the primary wireless carrier, identify a secondary wireless carrier, indicated in the received geographic configuration, associated with the geographic area from the plurality of wireless carriers; and
   an executable portion configured to initiate a session with the secondary wireless carrier.

20. The computer program product of claim 19, wherein the session with the primary wireless carrier is abandoned for failure to establish the session.

21. The computer program product of claim 20 further comprising an executable portion configured to indicate the primary wireless carrier as unavailable for a predetermined period of time.

22. The computer program product of claim 19, wherein the session with the primary wireless carrier is established and abandoned as a result of a network dropping the session.

23. The computer program product of claim 22 further comprising an executable portion configured to establish the session with the secondary wireless carrier.

24. The computer program product of claim 23 further comprising an executable portion configured to queue a pending message at least until the session with the secondary wireless carrier is established.

25. The computer program product of claim 19, wherein terminating the session with the primary wireless carrier is based at least in part one selected from the group consisting of (a) a network drop, (b) a communicated error code, and (c) a failure to transact messages.

26. The computer program product of claim 19, wherein the received station-type configuration is specific for the type of mobile station.

27. The computer program product of claim 26, wherein initiating the session with the primary wireless carrier is based at least in part on the geographic configuration and the station-type configuration.

28. A system comprising a mobile station and a central system, the mobile station being configured to:
   receive, from the central system, a geographic configuration for the mobile station, wherein the geographic configuration (a) is for a geographic area and (b) identifies a plurality of wireless carriers providing wireless services within the geographic area;
   receive, from the central system, a station-type configuration (a) specifying criteria in which the mobile station is to switch from using at least one primary wireless carrier identified in the geographic configuration to at least one secondary wireless carrier identified in the geographic configuration, and (b) specifying information identifying the manner in which the mobile station is designated to react to one or more wireless service issues;
   identify a primary wireless carrier, indicated in the geographic configuration, associated with the geographic area from the plurality of wireless carriers;
   initiate a session with the primary wireless carrier;
   after initiating a session with the primary wireless carrier, terminate the session with the primary wireless carrier based in part on the specified information of the station-type configuration;
   after terminating the session with the primary wireless carrier, identify a secondary wireless carrier, indicated in the geographic configuration, associated with the geographic area from the plurality of wireless carriers; and
   initiate a session with the secondary wireless carrier.

29. The system of claim 28, wherein the session with the primary wireless carrier is abandoned for failure to establish the session.

30. The system of claim 29, indicating the primary wireless carrier as unavailable for a predetermined period of time.

31. The system of claim 28, wherein the session with the primary wireless carrier is established and abandoned as a result of a network dropping the session.

32. The system of claim 31, wherein the mobile station is further configured to establish the session with the secondary wireless carrier.

33. The system of claim 32, wherein the mobile station is further configured to queue a pending message at least until the session with the secondary wireless carrier is established.

34. The system of claim 28, wherein terminating the session with the primary wireless carrier is based at least in part one selected from the group consisting of (a) a network drop, (b) a communicated error code, and (c) a failure to transact messages.

35. The system of claim 28, wherein the central system is configured to transmit (a) the geographic configuration for the mobile station and (b) the station-type configuration for the specific type of mobile station.

36. The system of claim 28, wherein initiating the session with the primary wireless carrier is based at least in part on the geographic configuration and the station-type configuration.

37. The system of claim 28, wherein the central system is configured to:
   receive call data from the mobile station;
   analyze the call data to identify fault patterns; and
   modify the geographic configuration based at least in part on the fault patterns identified in the call data.

38. The system of claim 28, wherein the central system is configured to activate the mobile station for operation with each of the plurality of wireless carriers.

* * * * *